United States Patent
Gibson et al.

(10) Patent No.: US 9,759,275 B2
(45) Date of Patent: Sep. 12, 2017

(54) ELECTRONIC CONTROL OF MANUAL TRANSMISSION CLUTCH

(71) Applicant: Ford Global Technologies, LLC, Dearborn, MI (US)

(72) Inventors: Alexander O'Connor Gibson, Ann Arbor, MI (US); Yuji Fujii, Ann Arbor, MI (US); Gregory Michael Pietron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 14/565,695

(22) Filed: Dec. 10, 2014

(65) Prior Publication Data
US 2016/0167659 A1    Jun. 16, 2016

(51) Int. Cl.
*B60W 10/02* (2006.01)
*F16D 48/06* (2006.01)
*B60W 30/18* (2012.01)

(52) U.S. Cl.
CPC ....... *F16D 48/06* (2013.01); *B60W 30/18027* (2013.01); *B60W 30/18072* (2013.01); *B60W 2510/0225* (2013.01); *B60W 2510/0275* (2013.01); *B60W 2710/022* (2013.01); *F16D 2500/1082* (2013.01);
(Continued)

(58) Field of Classification Search
CPC ..... B60W 30/18054; B60W 30/18027; B60W 30/18072; B60W 10/02; B60W 2510/1005; B60W 2510/1025; B60W 2510/0604; B60W 2510/0275; B60W 2710/022;
(Continued)

(56) References Cited

U.S. PATENT DOCUMENTS 5,624,350 A * 4/1997 Bates .................. B60W 10/02
                                            192/106 R
6,024,673 A * 2/2000 Hayashi .............. F16D 48/066
                                            192/13 R
(Continued)

FOREIGN PATENT DOCUMENTS

JP         EP 2302248 A2 *  3/2011   ............ B60W 10/02

OTHER PUBLICATIONS

Li, Dongxu, et al., Relative Torque Estimation on Transmission Output Shaft with Speed Sensors, SAE International No. 2011-01-0392, Apr. 12, 2011, 7 pages.
(Continued)

*Primary Examiner* — Roger Pang
(74) *Attorney, Agent, or Firm* — James Dottavio; Brooks Kushman P.C.

(57) ABSTRACT

A controller adjust a clutch actuator position is response to movement of a clutch pedal. During an engagement or a disengagement, the controller monitors sensor signals to determine the actuator position corresponding to the touch point. The sensors may directly indicate clutch torque or may respond indirectly. A Giant Magneto Resistive (GMR) sensor provides a precise shaft rotational position signal which can be twice numerically differentiated to yield an accurate and stable acceleration signal. The controller updates the touch point based on a change in the sensed acceleration or torque. The controller then adjusts the relationship of actuator pedal position to clutch pedal position, making mechanical wear adjustment unnecessary.

12 Claims, 9 Drawing Sheets

(52) U.S. Cl.
CPC ........... *F16D 2500/1083* (2013.01); *F16D 2500/10412* (2013.01); *F16D 2500/3069* (2013.01); *F16D 2500/3108* (2013.01); *F16D 2500/3109* (2013.01); *F16D 2500/3111* (2013.01); *F16D 2500/3144* (2013.01); *F16D 2500/31413* (2013.01); *F16D 2500/31466* (2013.01); *F16D 2500/7041* (2013.01); *F16D 2500/70414* (2013.01); *Y10T 477/75* (2015.01); *Y10T 477/753* (2015.01); *Y10T 477/78* (2015.01)

(58) Field of Classification Search
CPC .......... B60W 2510/0225; Y10T 477/75; Y10T 477/753; Y10T 477/78
USPC .......................................................... 701/68
See application file for complete search history.

(56) References Cited

U.S. PATENT DOCUMENTS

| | | | | |
|---|---|---|---|---|
| 6,170,624 | B1* | 1/2001 | Arai | F16D 48/064 |
| | | | | 192/3.58 |
| 6,394,931 | B1* | 5/2002 | Genise | B60W 10/06 |
| | | | | 477/107 |
| 7,559,259 | B2 | 7/2009 | Fruhwirth et al. | |
| 8,271,171 | B2 | 9/2012 | Terwart et al. | |
| 8,457,847 | B2 | 6/2013 | Li et al. | |
| 8,494,729 | B2 | 7/2013 | Li et al. | |
| 9,441,701 | B2* | 9/2016 | Cichon, Jr. | F16F 9/535 |
| 2002/0123410 | A1* | 9/2002 | Steeby | F16D 48/06 |
| | | | | 477/175 |
| 2005/0046375 | A1* | 3/2005 | Maslov | B60L 8/00 |
| | | | | 318/650 |
| 2008/0125285 | A1* | 5/2008 | Takeuchi | B60W 10/02 |
| | | | | 477/79 |
| 2009/0057092 | A1* | 3/2009 | Hayakawa | F16D 29/005 |
| | | | | 192/85.5 |
| 2009/0292432 | A1* | 11/2009 | Suzuki | F16D 25/0638 |
| | | | | 701/68 |
| 2010/0298094 | A1* | 11/2010 | Oda | F16D 48/064 |
| | | | | 477/179 |
| 2011/0098897 | A1 | 4/2011 | Busdiecker | |
| 2012/0271523 | A1* | 10/2012 | Sardari Iravani | B60T 7/122 |
| | | | | 701/70 |
| 2013/0158825 | A1 | 6/2013 | Bader et al. | |
| 2013/0173126 | A1* | 7/2013 | Ruebsam | B60W 10/02 |
| | | | | 701/67 |
| 2013/0278250 | A1 | 10/2013 | Raberg | |
| 2014/0067214 | A1* | 3/2014 | Ruebsam | F16D 48/06 |
| | | | | 701/67 |
| 2014/0095037 | A1* | 4/2014 | Seto | B60W 10/00 |
| | | | | 701/67 |
| 2014/0136064 | A1 | 5/2014 | Baek et al. | |
| 2014/0236442 | A1* | 8/2014 | Redbrandt | B60W 10/02 |
| | | | | 701/68 |
| 2015/0211625 | A1* | 7/2015 | Fujii | F16H 59/02 |
| | | | | 74/473.3 |
| 2016/0068163 | A1* | 3/2016 | Fujii | B60W 30/19 |
| | | | | 701/54 |

OTHER PUBLICATIONS

Li, Dongxu, et al., Transmission Virtual Torque Sensor—Absolute Torque Estimation, SAI International No. 2012-01-0111, Apr. 16, 2012, 6 pages.

* cited by examiner

FIG. 1 - PRIOR ART

ELECTRONIC CONTROL OF MANUAL TRANSMISSION CLUTCH

TECHNICAL FIELD

This disclosure relates to the field of transmission systems. More particularly, the disclosure pertains to a manual transmission with a clutch controlled by a controller in response to movement of a clutch pedal.

BACKGROUND

A typical manual powertrain is illustrated in FIG. 1. Solid lines represent mechanical power flow through rotating shafts. Dashed lines represent control connections, which may be implemented using mechanical linkages. Engine 10 generates power at crankshaft 12 by burning fuel. The engine responds to changes in the position of accelerator pedal 14 to generate more power when the pedal is depressed further by the driver. Transmission 16 transmits power from crankshaft 12 to output shaft 18. Transmission 16 includes a friction clutch 20 and a gearbox 22 connected by input shaft 24. Gearbox 22 is capable of establishing a variety of forward speed ratios and at least one reverse speed ratio in response to driver manipulation of shifter 26. The driver controls the torque capacity of clutch 20 by manipulation of clutch pedal 28. Differential 30 splits power from output shaft 18 between a left axle 32 driving a left wheel 34 and a right axle 36 driving a right wheel 38 while permitting slight speed differences between the axles as the vehicle turns a corner. In a typical rear wheel drive powertrain, the transmission output shaft is a driveshaft that extends to the differential. In a typical front wheel drive powertrain, the output shaft 16 may be driveably connected to the differential by a final drive gear. The transmission and differential of a front wheel drive powertrain are frequently combined into a single housing and called a transaxle.

For internal combustion engine 10 to generate power, crankshaft 12 must rotate at sufficient speed. However, when the vehicle is stationary with gearbox 22 establishing a speed ratio, input shaft 24 is also stationary. In order to start the vehicle moving, the driver controls the torque capacity of clutch 20 to transmit power from moving crankshaft 12 to stationary input shaft 24. As the vehicle accelerates the speed of input shaft 24 gradually increases until it is equal to the speed of crankshaft 12, at which point clutch 20 can be fully engaged. With clutch 20 fully engaged, the speed of crankshaft 12 is proportional to vehicle speed. As the vehicle accelerates in 1st gear, the speed of crankshaft 12 becomes excessive, necessitating a shift to 2nd gear. Gearbox 22 is not capable of changing ratios while transmitting power. Therefore, the driver shifts by disengaging clutch 20, then manipulating shifter 26 to change the gearbox ratio, then re-engaging clutch 20. Re-engagement of clutch 20 forces the crankshaft speed to become equal to input shaft speed, predominantly by changing the speed of the crankshaft.

Whenever clutch 20 transits torque between shafts rotating at different speeds, as during a vehicle launch event, some power must be dissipated. Power is the product of speed and torque. During a launch event, the torque exerted by the crankshaft and the torque exerted on the input shaft are both equal to the clutch torque capacity. The power flowing into the clutch is the torque capacity multiplied by the crankshaft speed. The power flowing out of the clutch mechanically is the torque capacity multiplied by the input shaft speed. The difference between the power inflow and the mechanical power outflow is dissipated by conversion into heat. Initially, the heat is absorbed into clutch components causing the temperature of those components to increase. Then, the heat is gradually transferred to the environment through convection, conduction, and radiation, gradually reducing the temperature of the clutch components.

The amount of energy dissipated by the clutch in a time interval is equal to the integral of the power dissipation over time. If an excessive amount of energy is dissipated in a short amount of time, the clutch temperature will rise excessively. When the clutch temperature is elevated, the rate of wear of the clutch facing material increased dramatically. At sufficiently high temperatures, the friction coefficient of the material decreases and the clutch may be incapable of achieving sufficient torque capacity. Driver technique in manipulating the accelerator pedal, clutch pedal, and shifter strongly influences energy dissipation.

SUMMARY OF THE DISCLOSURE

A vehicle includes an engine, a clutch, a gearbox, and a controller. The gearbox establishes one of a plurality of power flow paths between an input shaft and an output shaft in response to movement of a shift lever. The clutch transmits torque from the engine to the input shaft with a torque capacity that varies in response to a position of a clutch actuator. The torque capacity is negligible when the actuator position is on a released side of a touch point and increases monotonically with respect to actuator positions on an engaged side of the touch point. The controller adjusts the actuator position according to a function of a clutch pedal position. During a first launch event, the controller monitors a sensor array and modifies the function in response to the received signals. The sensor array may include a torque sensor, a rotational speed sensor such as a Giant Magneto Resistive (GMR) sensor, or an acceleration sensor. During a second launch, the controller adjusts the actuator position according to the modified function of the pedal position. The function modified such that, as the touch point changes due to wear or other effects, the touch point corresponds to a constant, predetermined clutch pedal position. Under certain conditions, the controller may adjust the actuator to the released side of the touch point while the clutch pedal is on an engaged side of the constant, predetermined position. These conditions include coasting with the accelerator pedal released and the vehicle being stationary with the transmission engaged in a forward drive power flow path. In some circumstances, the controller may shut the engine off while the clutch actuator is in a released position and may maintain the actuator in a released position, independent of the clutch pedal position, until the engine is restarted.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
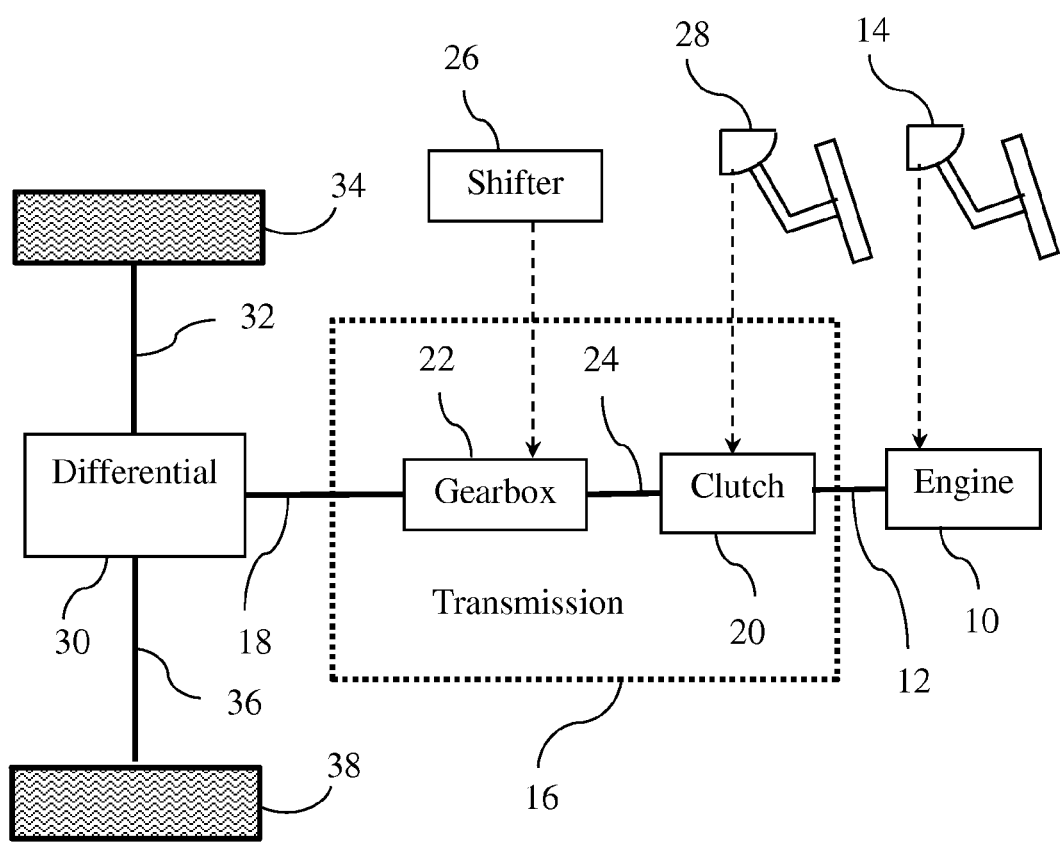
FIG. 1 is schematic illustration of a vehicle powertrain having a manual transmission.
Figure 2:
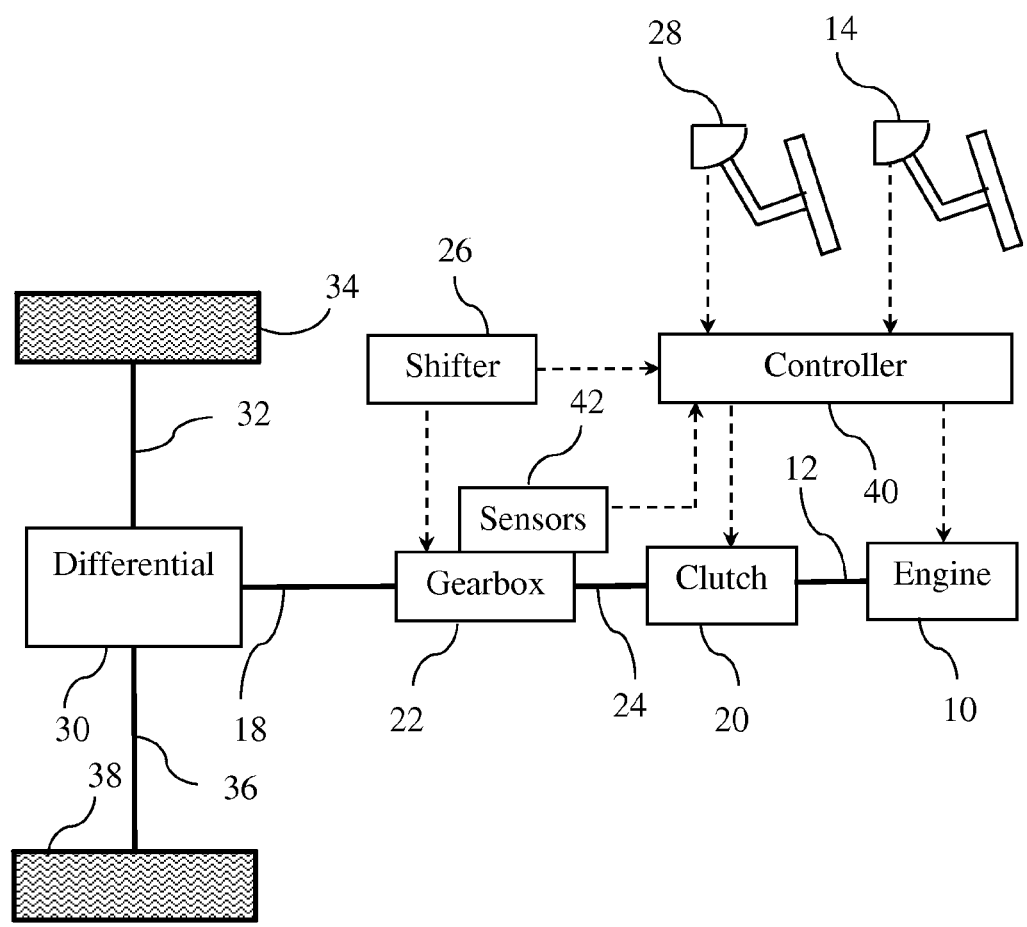
FIG. 2 is a schematic illustration of a vehicle powertrain having a manual transmission with an electronically actuated clutch.

FIG. 2 illustrates a powertrain that utilizes a controller to add features not practical in the purely manual powertrain of FIG. 1. In the powertrain of FIG. 2, engine 10 and clutch 20 do not respond directly to movement of the accelerator pedal 14 and the clutch pedal 28 respectively. Instead, controller 40 senses the position of the pedals and sends commands to the engine and clutch. In some instances, the commands may not correspond directly to driver commands as indicated by manipulation of the pedals. To assist in determining the proper commands, the controller may receive additional signals, including a signal indicating the position of shifter 26 and signals from an array of sensors 42 in gearbox 22.

Figure 3:
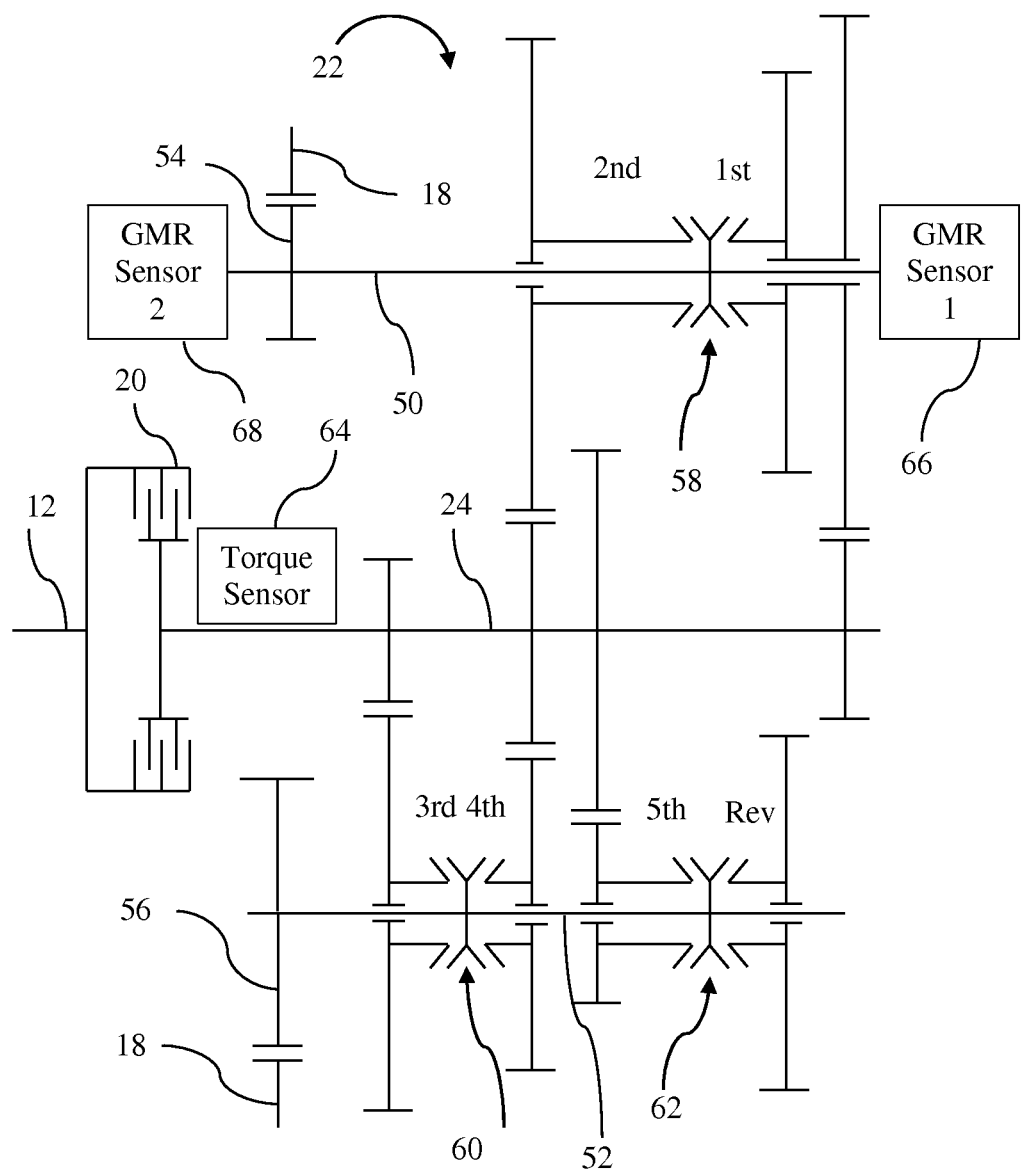
FIG. 3 is a schematic diagram of a gearing arrangement for a manual transmission.

FIG. 3 illustrates an exemplary configuration of a front wheel drive transmission. Transmission output 18 is a final drive ring gear fixed to a carrier of a differential. Two countershafts, 50 and 52 are parallel to transmission input shaft 24. Final drive pinion gears 54 and 56 are fixed to countershafts 50 and 52 respectively and mesh continuously with output gear 18. Therefore, the speeds of the countershafts are related to the speed of output 18 by fixed ratios. A number of gears fixed to input shaft 24 mesh with corresponding gears that are supported for rotation about one of the countershafts. Particular gear ratios are engaged by moving one of the synchronizers 58, 60, or 62, to selectively couple one of these gears to one of the countershafts. A shift mechanism (not shown) moves the synchronizers in response to driver manipulation of the shifter 26.

The transmission also includes a number of sensors which respond in various ways to clutch torque. These sensors collectively make up sensor array 42. Several methods of determining torque are described below, although only one method of determining torque is required. Particular embodiments may determine torque using a subset of the sensors shown in FIG. 3 or may utilize different sensors that respond to clutch torque. Torque sensor 64 directly senses the torque on input shaft 24 which, when clutch 20 is slipping, is equal to the clutch torque capacity. For example, torque sensor 64 may measure the shear strain in the shaft.

Two Giant Magneto Resistive (GMR) sensors 66 and 68 are located at opposite ends of countershaft 50. GMR sensors generate a voltage that varies sinusoidally based on the rotational position of a magnet fixed to the end of a shaft. GMR sensors provide a rotational position measurement accurate to a fraction of a degree at intervals of around 50 micro-seconds. Unlike the speed sensors commonly used in transmissions, GMR sensors can provide a usable signal even when the shaft is at zero speed. One limitation of GMR sensors is that they must be mounted at the end of a shaft. However, in this application, that is not a problem.

When either 1st or 2nd gear is selected, at least a portion of countershaft 50 will transmit torque that is proportional to the clutch torque. The portion of the shaft transmitting the torque is twisted as a result of the torque. The amount of twist can be measured by measuring rotational position of each end of the shaft and taking the difference. The clutch torque is proportional to this difference. The coefficient of proportionality differs between 1st and 2nd gear.

Due to the accuracy of GMR position signals, an accurate and stable speed signal can be obtained by differentiating the position signal. In turn, an accurate rotational acceleration signal can be obtained by differentiating the rotational speed signal. The acceleration of countershaft shaft 50 is proportional to vehicle acceleration, independent of which gear ratio, if any, is selected. Vehicle acceleration is related to proportional to clutch torque, the selected gear ratio, and inversely proportional to vehicle mass. Since the selected gear ratio is known to the controller and the vehicle mass typically changes relatively slowly within a narrow range, vehicle acceleration can be used as a surrogate for clutch torque for some purposes. Vehicle acceleration also responds to additional factors such as road grade, wind, and road resistance. These factors also tend to change relatively slowly such that the controller can compensate for them. Deriving a surrogate torque signal based on vehicle acceleration requires only one of the GMR sensors 66 or 68.

Figure 4:
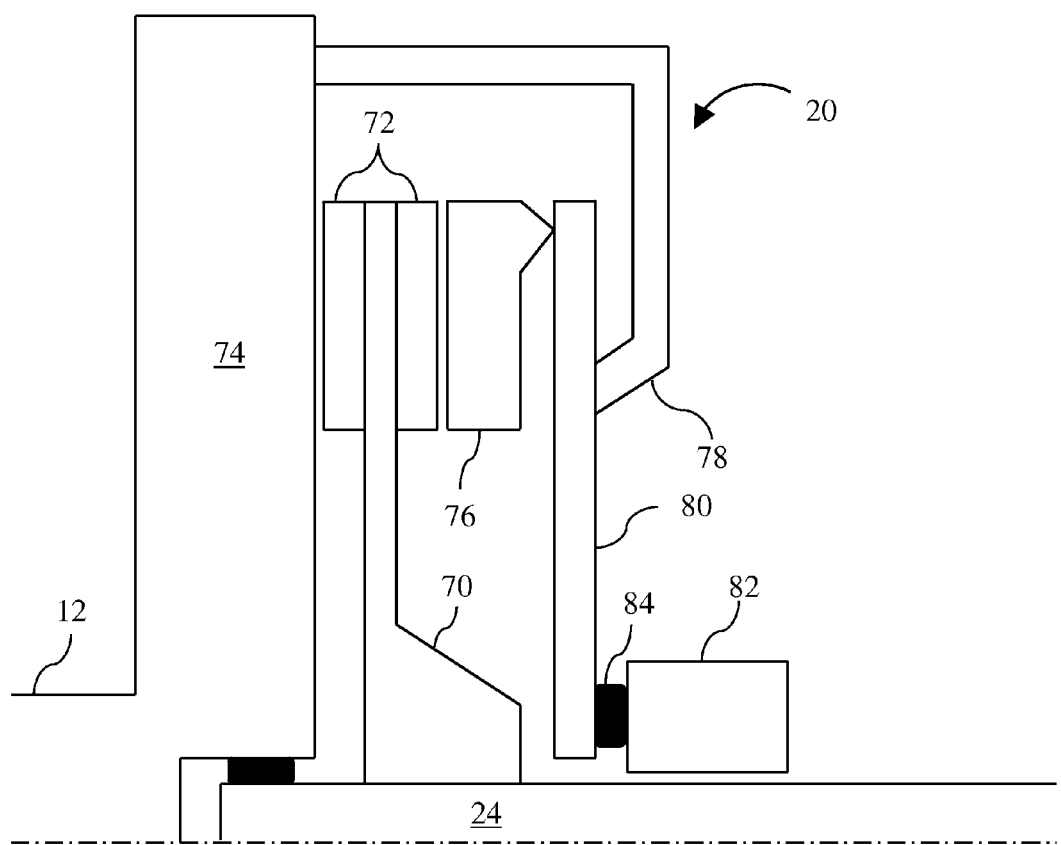
FIG. 4 is a cross section of an electronically actuated manual transmission clutch in a disengaged position.

FIG. 4 shows a cross sectional view of a clutch 20. A clutch disk 70 is splined to gearbox input shaft 24. In some embodiments, clutch disk 70 may include a damper to provide torsional isolation between the engine and driveline when the clutch is engaged. Friction material 72 is attached to the front and back sides of clutch disk 70. A flywheel 74 is fixed to crankshaft 12. In some embodiments, the flywheel may include provisions for torsional isolation. A pressure plate 76 is supported for rotation with the flywheel, but allowed to move axially. A clutch cover 78 is fixed to the flywheel. A diaphragm spring 80 is attached to the clutch cover 78. In its natural state, diaphragm spring 80 is conical is shape such that it tends to push the pressure plate to compress the clutch disk between the pressure plate and the flywheel. However, in the disengaged state shown in FIG. 4, an actuator 82 has pushed the center of diaphragm spring inward such that the spring assumes a more flat shape, allowing for slight separation between the friction material 72 and the flywheel and pressure plate. Since actuator 82 does not rotate and diaphragm spring 80 rotates with the flywheel, they are separated by a bearing 84.

Figure 5:
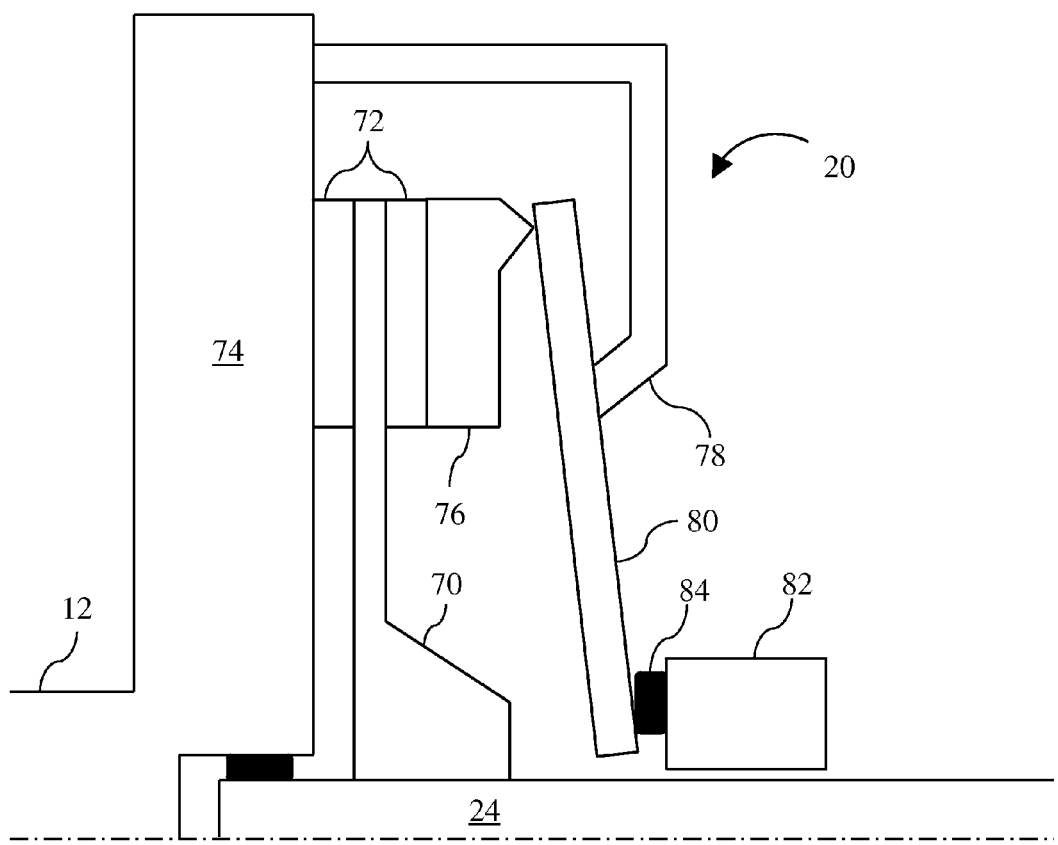
FIG. 5 is a cross section of an electronically actuated manual transmission clutch at a touch point position.
Figure 6:
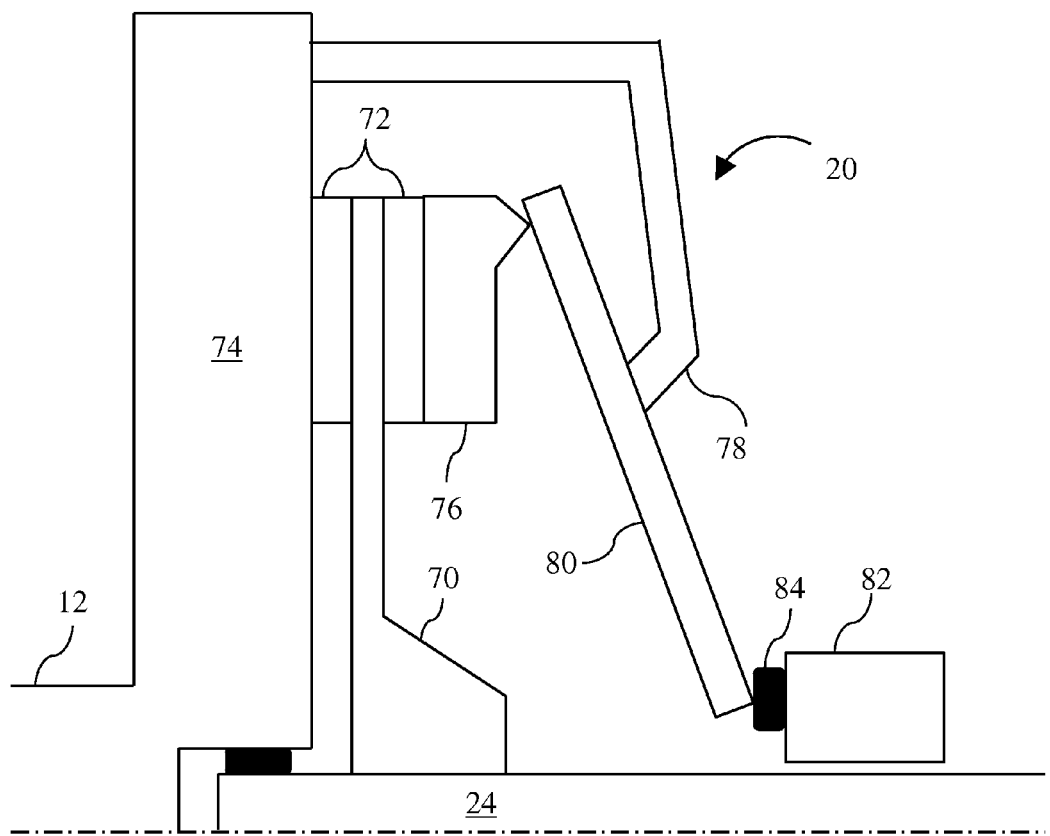
FIG. 6 is a cross section of an electronically actuated manual transmission clutch in an engaged position.

FIG. 5 shows the clutch with the actuator moved to the touch point. At the touch point, the pressure plate has moved toward the flywheel enough to eliminate the space such that the friction material 72 is in contact with the flywheel and pressure plate, but the normal force compressing the friction material is zero. Since the normal force is zero, the torque capacity of the clutch is zero at the touch point. FIG. 6 shows the clutch with the actuator moved beyond the touch point. As the actuator position moves beyond the touch point, the normal force compressing the friction material increases. Consequently, the torque capacity of the clutch also increases.

Figure 7:
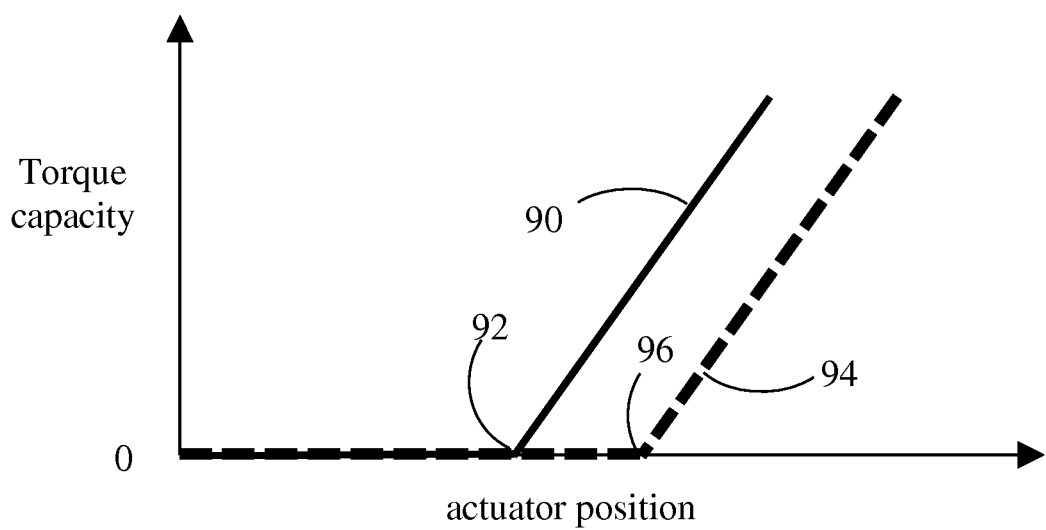
FIG. 7 is a graph of clutch torque capacity as a function of clutch actuator position.

FIG. 7 illustrates the relationship between actuator position and torque capacity. Line 90 indicates the relationship for a new clutch. The torque capacity is zero when the actuator position is less than the touch point 92 and the increases steadily as actuator position increases. Controller 40 determines a desired torque capacity based on clutch pedal position, among other inputs, and uses information about the relationship between actuator position and torque capacity to determine what actuator position to command. As the clutch is used, the friction material 72 gradually wears away. Line 94 illustrates the relationship for the same clutch after significant friction material wear has occurred. The touch point 96 increases as the clutch wears. In addition to clutch wear, other noise factors such as temperature may shift the touch point. If the controller uses an incorrect estimate of the touch point, the torque capacity may differ substantially from the desired torque capacity.

The clutches of some manual transmissions are equipped with mechanical wear compensators that shift the touch point back such that it corresponds to roughly the same clutch pedal position. However, mechanical wear compensators tend to make the adjustments in discrete steps. These discrete steps are small enough that drivers typically do not notice. However, to a controller capable of finer control, unpredictable adjustments create an additional noise factor. Therefore, it is desirable to replace the mechanical wear compensation devices of manual transmissions with algorithmic wear compensation.

Figure 8:
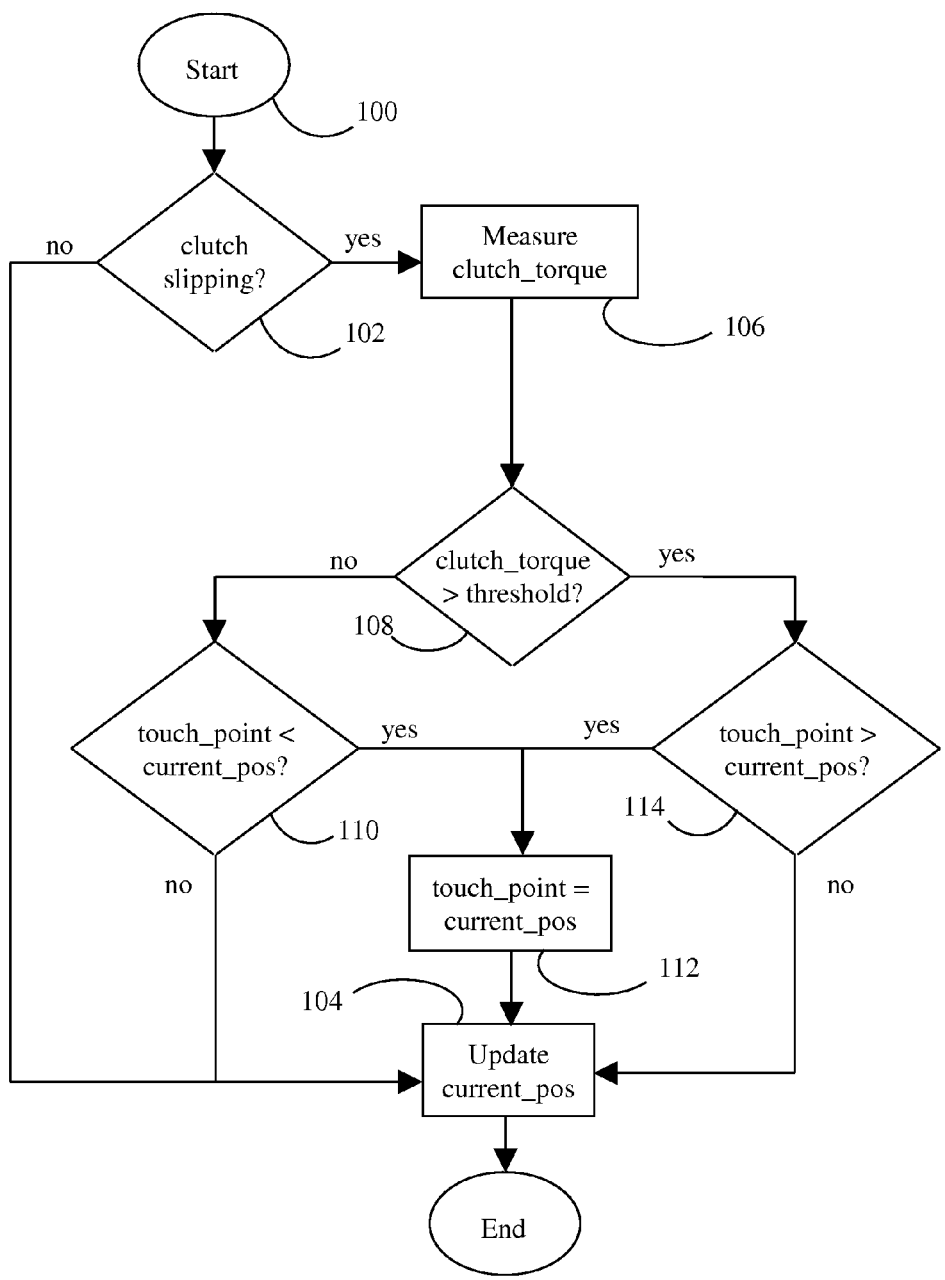
FIG. 8 is a flow chart for a method of adaptively updating a touch point estimate using a clutch torque measurement.

FIG. 8 is a flow chart for adaptively determining the actuator position corresponding to the clutch touch point when a clutch torque signal is available. The method is executed, beginning at 100, at regular intervals. If the clutch is not slipping, as determined at 102, the method proceeds to 104 to update the current actuator position without updating the touch point. For example, the actuator position may be set according to a function of a sensed clutch pedal position such that a predetermined pedal position places the actuator at the estimated clutch touch point. If the clutch is slipping, the method proceeds to 106 to measure the clutch torque using one of the methods described above or some other method. Equivalently, the method may measure a quantity that is directly proportional to clutch torque, such as a transmission shaft torque. If the measured clutch torque is less than a threshold at 108, the method branches based on a conclusion that the current actuator position is less than the actual touch point. The threshold is set near zero, but large enough that sensor variation does not falsely conclude that the clutch is in the transmitting torque. At 110, the current estimate of the touch point is compared to the current actuator position. If the estimate of the touch point is less than the current position, then the estimate of the touch point is updated at 112 to be equal to the current position. Then, the current position is updated based on the function of pedal position and the revised estimate of the touch point. Alternatively, updating the function based on the revised clutch point may be delayed until after the current event, such as a vehicle launch event or a shift is completed. If the measured clutch torque exceeds the threshold at 108, on the other hand, the method branches based on the conclusion that the current actuator position is past the touch point such that the clutch torque is responding linearly to changes in actuator position. If that conclusion is inconsistent with the current estimate of the touch point, as determined at 114, then the estimate is updated at 112 and the current position is updated at 104.

Figure 9:
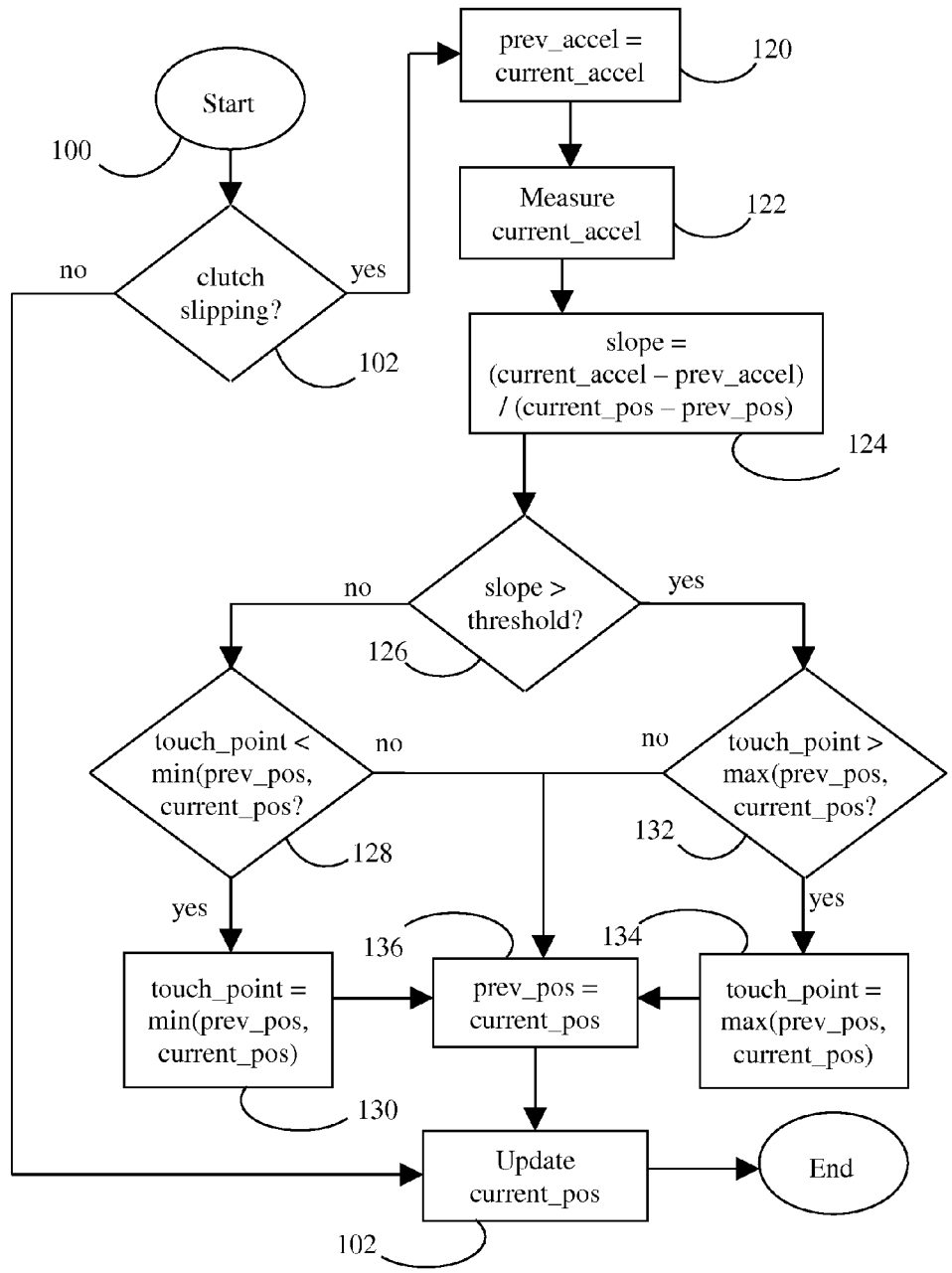
FIG. 9 is a flow chart for a method of adaptively updating a touch point estimate using an acceleration measurement.

FIG. 9 is a flow chart for adaptively determining the actuator position corresponding to the clutch touch point when a vehicle acceleration signal is available. As with the method of FIG. 8, the method is executed, beginning at 100, at regular intervals. If the clutch is not slipping, as determined at 102, the method proceeds to 104 to update the current actuator position without updating the touch point. If the clutch is slipping, the method proceeds to 120 where the method records the acceleration measurement of the previous execution of the method, corresponding to a previous actuator position. At 122 the method measures vehicle acceleration or a quantity that is directly proportional to vehicle acceleration such as the acceleration of a transmission shaft. At 124, the method calculates the slope of the relationship between acceleration and actuator position between the previous execution of the method and the current execution. If the clutch position is less than the touch point, this slope would nominally be zero. If the clutch position is greater than the touch point, the slope will be related to the gear ratio. If the computed slope is less than a threshold at 126, the method branches based on a conclusion that the current actuator position is less than the actual touch point. Different thresholds may be used when different gear ratios are selected. Furthermore, an absolute value may be used when reverse gear is selected. At 128 and 130, the current estimate of the touch point is updated if it is less than both the current and the previous position. If the computed slope is greater than the threshold at 126, the method branches based on a conclusion that the current actuator position is greater than the actual touch point. At 132 and 134, the current estimate of the touch point is updated if it is greater than both the current and the previous position. At 136, the current actuator position is recorded for use in the next execution. Then, the current position is updated based on the pedal position.

If the actual touch point changes, the methods of either FIG. 8 or FIG. 9 will result in a change in the estimate of the touch point following a clutch engagement event. As a result, the controller will modify the function that relates commanded actuator position to sensed clutch pedal position. Then, during a subsequent launch or shift event, the actuator position will be different for a given clutch pedal position. As the clutch wears, or as other noise factors influence the actual touch point, the function may be modified such that the pedal position at the clutch touch point remains nearly constant.

Although the nominal behavior of the controller is to position the actuator based solely on the position of the clutch pedal, the controller may depart from this behavior is some circumstances. The ability to over-ride the driver clutch pedal movement is one of the advantages of an electronically actuated clutch. One such circumstance occurs when the vehicle is coasting (neither accelerator pedal nor brake pedal depressed) and the driver leaves the transmission in gear with the clutch pedal released (which corresponds to the clutch being engaged). In this circumstance, vehicle inertia causes the engine to rotate. This causes the engine to exert drag torque which may be substantial if the engine speed is relatively high. To prevent the vehicle from decelerating unnecessarily, the controller may move the clutch actuator to a released position and then control the engine to rotate at idle speed. Alternatively, the controller may shut the engine off to reduce fuel consumption further. When the driver depresses the accelerator, the controller must quickly bring the engine back to synchronous speed and then re-engage the clutch. In order to be able to re-engage quickly, the controller positions the actuator close to the touch point, but on the released side of the touch point. For the controller to accomplish this, it must have accurate information about the location of the touch point.

When the vehicle is stopped, the controller may shut the engine off to save fuel. The controller must then quickly restart the engine when the driver releases the brake pedal and depresses the accelerator pedal. Some manual transmission drivers waiting at a stop light disengage the transmission with shifter 26 and release clutch pedal 28. When they are ready to drive away, they depress the clutch pedal 28, engage 1st gear with shifter 26, and then step on the accelerator pedal 14 and gradually release clutch pedal 28. These sequential steps give the controller sufficient time to restart the engine before the driver begins releasing the clutch pedal. However, other drivers leave the transmission in 1st gear and depress clutch pedal 28 while waiting at a stop light. If the controller stops the engine in this circumstance, the driver may begin releasing the clutch pedal before the controller has started the engine. If the driver engages the clutch before the engine is started, that will prevent a proper engine start. With the electronically actuated clutch described herein, the controller can prevent engagement of the clutch until the engine has restarted. Therefore, the controller can stop the engine in more conditions than otherwise, reducing fuel consumption. Specifically, the controller moves the actuator to a released position near the touch point while the engine is shut down and maintains the actuator in that position, regardless of clutch pedal position, until the engine has restarted.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   a gearbox configured to establish various power flow paths between an input shaft and an output shaft in response to movement of a driver operable shift lever;
   a clutch actuator having an actuator position;
   a clutch configured to transmit torque from an engine to the input shaft, the clutch having a torque capacity that varies with the actuator position;
   a sensor array configured to respond to torque on the input shaft;
   a driver operable clutch pedal having a pedal position; and
   a controller programmed
   to adjust the actuator position in response to changes in the pedal position during a first clutch slip event according to a function of pedal position,
   to receive signals from the sensor array during the first clutch slip event,
   to modify the function of pedal position in response to the received signals such that, as a clutch touch point changes, the clutch touch point corresponds to a constant pedal position, and
   to adjust the actuator position in response to changes in the pedal position during a second clutch slip event according to the modified function of pedal position.

2. The vehicle of claim 1 wherein the controller is further programmed to adjust the actuator position to a position on a released side of the touch point while the clutch pedal is positioned on an engaged side of the constant pedal position.

3. The vehicle of claim 2 wherein the controller adjusts the actuator position to the position on the released side of the touch point while the clutch pedal is positioned on the engaged side of the constant pedal position in response to release of an accelerator pedal.

4. The vehicle of claim 1 wherein the sensor array comprises a torque sensor.

5. The vehicle of claim 1 wherein the sensor array comprises a first rotational position sensor.

6. The vehicle of claim 5 wherein the rotational position sensor is a Giant Magneto Resistive (GMR) sensor.

7. The vehicle of claim 1 wherein the sensor array comprises an acceleration sensor.

8. The vehicle of claim 1 wherein the first clutch slip event is a launch event.

9. The vehicle of claim 1 wherein the first clutch slip event is a shift event.

10. A controller comprising:
    communications channels to receive signals from a clutch pedal sensor and a GMR sensor and to send a signal to a clutch actuator; and
    control logic programmed to
    command the actuator to move in response to the signal from the clutch pedal according to a function relating an actuator position to a clutch pedal position, and
    modify the function in response to the signal from the GMR sensor during a launch event such that, as a clutch touch point changes, the clutch touch point corresponds to a constant pedal position.

11. The controller of claim 10 wherein modifying the function in response to the signal from the GMR sensor comprises:
    computing a speed by differentiating the signal from the GMR sensor;
    computing an acceleration by differentiating the speed;
    updating an actuator touch point based on the acceleration; and
    modifying the function such that the actuator touch point corresponds to a constant clutch pedal position.

12. A controller comprising:
    communications channels to receive signals from a sensor array and to send a signal to a clutch actuator; and
    control logic programmed to
    command the actuator to move according to a function relating an actuator position to a clutch pedal position, and
    modify the function in response to the signals from the sensor array while detecting clutch slip such that a pedal position corresponding to a touch point remains constant.

* * * * *